United States Patent
Liu et al.

(10) Patent No.: US 12,149,408 B2
(45) Date of Patent: Nov. 19, 2024

(54) DEVICE ORIENTED EDGE DEPLOYMENT

(71) Applicant: International Business Machines Corporation, Armonk, NY (US)

(72) Inventors: Su Liu, Austin, TX (US); John A Walicki, Ridgewood, NJ (US); Neil Delima, Scarborough (CA); David Jason Hunt, Kirkwood, MO (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 18/172,508

(22) Filed: Feb. 22, 2023

(65) Prior Publication Data
US 2024/0283700 A1    Aug. 22, 2024

(51) Int. Cl.
*H04L 41/0806* (2022.01)

(52) U.S. Cl.
CPC .............................. *H04L 41/0806* (2013.01)

(58) Field of Classification Search
CPC ... H04L 41/5051; H04L 43/065; H04L 47/83; H04L 65/61; H04L 67/61; H04L 67/1008; H04L 63/105; H04L 67/108; H04W 12/009; G06F 9/46; G06F 9/4881; G06F 9/5038; G06F 9/5094; G06F 9/5044; G06F 9/5072; H02W 28/10
See application file for complete search history.

(56) References Cited

U.S. PATENT DOCUMENTS

| | | |
|---|---|---|
| 10,009,222 B2 | 6/2018 | Liu |
| 10,346,406 B2 | 7/2019 | Booz |
| 10,382,264 B2 | 8/2019 | Hwang |

(Continued)

FOREIGN PATENT DOCUMENTS

| | | |
|---|---|---|
| CN | 104346214 B | 2/2015 |
| CN | 109918205 A | 6/2019 |

(Continued)

OTHER PUBLICATIONS

Friedmar et al., "10 Criteria to Consider for Your Industrial Edge Compute Devices", Industrial Automation Blog, Belden Inc., Jul. 22, 2022, 4 Pages.

(Continued)

*Primary Examiner* — Dustin Nguyen
(74) *Attorney, Agent, or Firm* — Anthony M. Pallone

(57) ABSTRACT

According to one embodiment, a method, computer system, and computer program product for managing application deployment among edge devices is provided. The embodiment may include identifying respective computing characteristics of all edge devices of a network. The embodiment may include categorizing the edge devices into one or more categories based on identified respective computing characteristics. The embodiment may include classifying a type of a computing task to be deployed to one or more of the edge devices. The embodiment may include mapping the computing task to a category of the one or more categories. The embodiment may include calculating a respective computing score for each edge device of the category. The embodiment may include ranking edge devices of the category based on their respective computing scores. The embodiment may include deploying the computing task to a top-ranked edge device of the category.

18 Claims, 2 Drawing Sheets

(56) References Cited

U.S. PATENT DOCUMENTS

| | | | |
|---|---|---|---|
| 10,956,211 B2* | 3/2021 | Wright | G06F 9/4881 |
| 11,144,340 B2 | 10/2021 | Warnicke | |
| 11,159,449 B1* | 10/2021 | Nishimura | H04L 67/61 |
| 11,327,806 B1 | 5/2022 | Nagaraja | |
| 11,343,202 B1 | 5/2022 | Anshuman | |
| 11,716,355 B1* | 8/2023 | Maeng | H04L 63/105 |
| 2019/0020657 A1* | 1/2019 | Egner | H04W 12/009 |
| 2020/0076715 A1* | 3/2020 | Kondapalli | H04L 43/065 |
| 2020/0272509 A1* | 8/2020 | Wright | G06F 9/5038 |
| 2020/0351336 A1* | 11/2020 | Campbell | H04L 67/1008 |
| 2021/0014303 A1* | 1/2021 | Guim Bernat | H04L 41/5051 |
| 2022/0086195 A1* | 3/2022 | Amento | H04L 65/61 |
| 2022/0114028 A1* | 4/2022 | Peng | G06F 9/5072 |
| 2022/0197773 A1* | 6/2022 | Butler | H04L 47/83 |
| 2022/0232423 A1* | 7/2022 | Thyagaturu | H04W 28/10 |
| 2022/0308931 A1* | 9/2022 | Chen | G06F 9/5044 |
| 2023/0081937 A1* | 3/2023 | Liu | H04L 67/08 718/104 |
| 2023/0231903 A1* | 7/2023 | Zeng | H04L 67/1008 709/223 |
| 2023/0247418 A1* | 8/2023 | Sun | G06F 9/46 370/328 |
| 2023/0376355 A1* | 11/2023 | Liu | G06F 9/5094 |
| 2024/0195867 A1* | 6/2024 | Bapst | H04L 67/1008 |

FOREIGN PATENT DOCUMENTS

| | | |
|---|---|---|
| CN | 113747554 B | 12/2021 |
| WO | 2021197245 A1 | 10/2021 |
| WO | 202227776 A1 | 2/2022 |

OTHER PUBLICATIONS

Ju et al., "Innovation Trend of Edge Computing Technology Based on Patent Perspective", Hindawi, Wireless Communications and Mobile Computing, vol. 2021, Article ID 2609700, Jun. 4, 2021, 10 Pages.

* cited by examiner

DEVICE ORIENTED EDGE DEPLOYMENT

BACKGROUND

The present invention relates generally to the field of computing, and more particularly to edge computing.

Edge computing is a distributed information technology architecture in which client data is processed at the periphery of a network, as close to the originating data source as possible, in order to minimize bandwidth and reduce network latency. A goal of edge computing is to reduce communication time between client computing devices and servers (e.g., one or more cloud servers). Through the use of edge computing, time sensitive data may be sent to an intermediary device, located in close geographical proximity to the originating source of data, whereas data that is less time sensitive may be sent to the cloud. In addition to facilitating near real-time data processing, benefits of edge computing may include improved response time, as data avoids travel to a remote data center for processing, network bandwidth optimization, as reduced amounts of data are transmitted over a network, and security optimization.

SUMMARY

According to one embodiment, a method, computer system, and computer program product for managing application deployment among edge devices is provided. The embodiment may include identifying respective computing characteristics of all edge devices of a network. The embodiment may include categorizing the edge devices into one or more categories based on identified respective computing characteristics. The embodiment may include classifying a type of a computing task to be deployed to one or more of the edge devices. The embodiment may include mapping the computing task to a category of the one or more categories. The embodiment may include calculating a respective computing score for each edge device of the category. The embodiment may include ranking edge devices of the category based on their respective computing scores. The embodiment may include deploying the computing task to a top-ranked edge device of the category.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
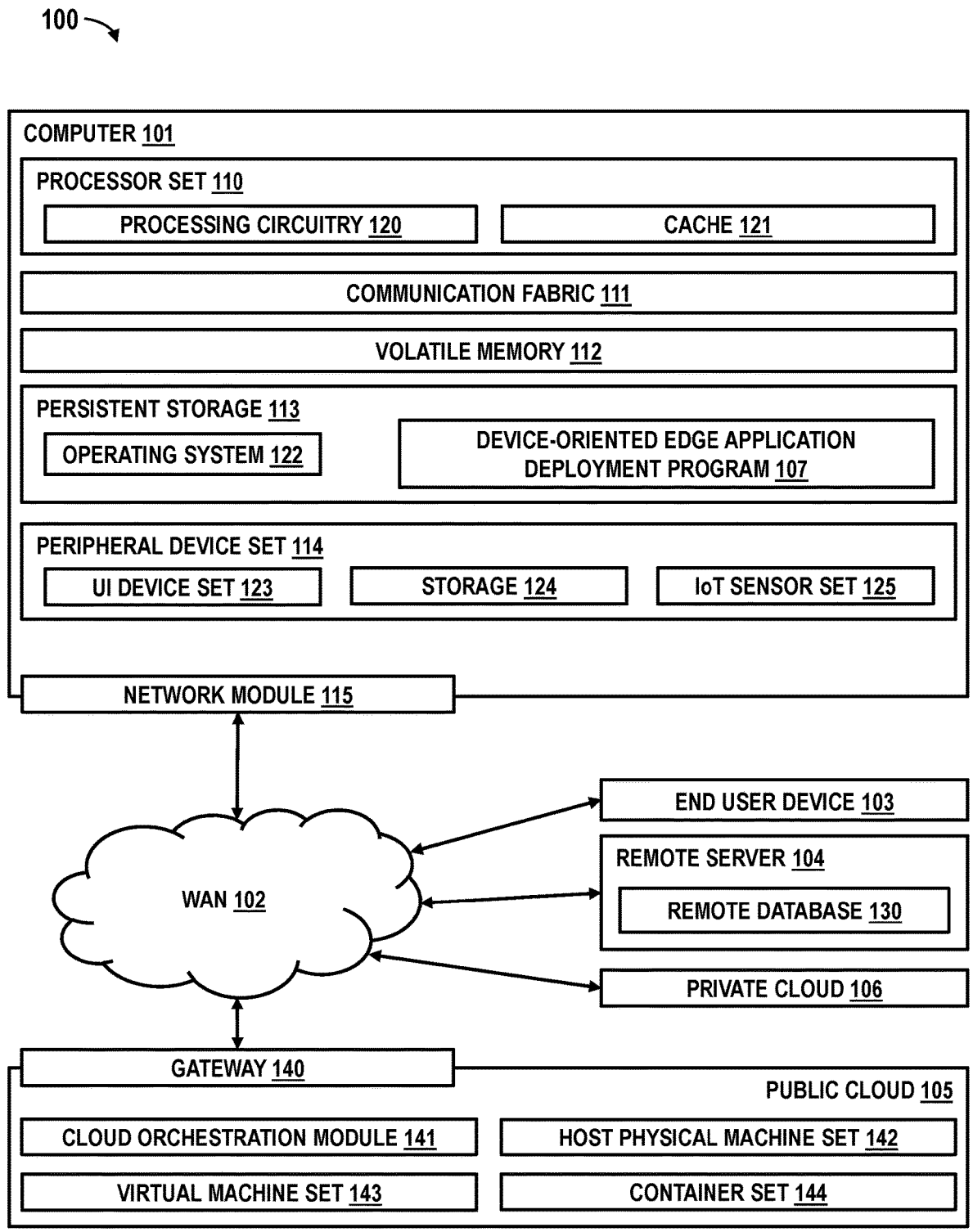
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to edge computing. The following described exemplary embodiments provide a system, method, and program product to, among other things, select an edge device, among multiple edge devices, for application deployment based on computing characteristics of the edge device. Therefore, the present embodiment has the capacity to improve the technical field of edge computing by dynamically deploying an application to a selected edge device based on a task of the application and computing capabilities of the selected edge device, thus intelligently deploying an application to an edge device of a group according to a computing task type of the application and available compute resources of the edge device and enhancing edge computing management.

As previously described, edge computing is a distributed information technology architecture in which client data is processed at the periphery of a network, as close to the originating data source as possible, in order to minimize bandwidth and reduce network latency. A goal of edge computing is to reduce communication time between client computing devices and servers (e.g., one or more cloud servers). Through the use of edge computing, time sensitive data may be sent to an intermediary device, located in close geographical proximity to the originating source of data, whereas data that is less time sensitive may be sent to the cloud. In addition to facilitating near real-time data processing, benefits of edge computing may include improved response time, as data avoids travel to a remote data center for processing, network bandwidth optimization, as reduced amounts of data are transmitted over a network, and security optimization.

The move towards edge computing has been driven, in part, by factors such as advances in mobile computing, decreasing cost of computer components, and increasing utilization of networked Internet-of-Things (IoT) devices. Moreover, advances in processing power with differing computing capabilities and characteristics (e.g., central processing unit (CPU) capabilities versus graphics processing unit (GPU) capabilities), combined with growing connectivity, of such IoT devices has further enabled widespread adoption of edge computing. Likewise, there has been increasing development of software applications based on emerging technologies such as real-time video processing, augmented/virtual reality simulations, deep learning, and the like, which require increasing computing capacity for workload execution and may benefit from, or require, edge deployment. Typically, edge device selection for application deployment is static and predefined. There is no ideal dynamic application task-based and device-oriented method to intelligently select an edge device for application deployment based on characteristics of the edge device. As such, an application workload which is deployed to a selected edge device may not be capable of executing on the selected device due to localized device compute resources, networking capabilities, or various custom localized attributes. It may therefore be imperative to have an edge application management system in place to deploy an application as far out to the edge as possible while taking into consideration computing characteristics of available edge devices as well as workload execution requirements of the application. Thus, embodiments of the present invention may be advantageous to, among other things, define a framework for supporting device-oriented edge application deployment (DOEAD) and management according to edge computing tasks and edge device characteristics, define a DOEAD data structure for tracking and saving device-oriented edge deployment data, maintain and update DOEAD service profiles according to characteristics of registered edge devices of a network, analyze characteristics of registered edge devices, categorize registered edge devices based on analyzed respective characteristics, classify edge computing tasks (i.e., application workloads to be deployed), map classified edge computing tasks to categorized registered edge devices, calculate edge computing scores of registered edge devices, prioritize/rank registered edge devices of a category based on calculated computing scores, and deploy edge computing tasks to top prioritized edge devices of a mapped category. The present invention does not require that all advantages need to be incorporated into every embodiment of the invention.

According to at least one embodiment, a device-oriented edge application deployment program may analyze computing characteristics of registered edge devices of a network. The device-oriented edge application deployment program may categorize the registered edge devices according to the analyzed computing characteristics. Additionally, the device-oriented edge application deployment program may classify edge computing tasks (i.e., to-be-deployed application workloads) by type. According to at least one embodiment, the device-oriented edge application deployment program may respectively map classified edge computing tasks to a category of registered edge devices. For each category, the device-oriented edge application deployment program may calculate a respective edge computing score for registered edge devices of the category and may prioritize/rank registered edge devices according to their respective edge computing scores. Finally, the device-oriented edge application deployment program may deploy a classified edge computing task to the top-K ranked registered edge devices of its mapped category.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to manage edge application deployment based on characteristics of registered edge devices of a network and edge application task types.

Referring to FIG. 1, an exemplary computing environment 100 is depicted, according to at least one embodiment. Computing environment 100 contains an example of an environment for the execution of at least some of the computer code involved in performing the inventive methods, such as device-oriented edge application deployment (DOEAD) program 107. In addition to DOEAD program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and DOEAD program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in DOEAD program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in DOEAD program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an edge device capable of connecting to computer 101 via WAN 102 and network module 115 and capable of receiving instructions from DOEAD program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The DOEAD program 107 may be a program capable of defining a framework for supporting device-oriented edge application deployment and management according to edge computing task types and edge device computing characteristics, defining a device-oriented edge application deployment data structure for tracking and saving device-oriented edge deployment data, maintaining and updating device-oriented edge application deployment service profiles according to characteristics of registered edge devices of a network, analyzing characteristics of registered edge devices, categorizing registered edge devices based on analyzed respective characteristics, classifying edge computing tasks (i.e., application workloads to be deployed), mapping classified edge computing tasks to categorized registered edge devices, calculating edge computing scores of registered edge devices, prioritizing/ranking registered edge devices of a category based on calculated computing scores, and deploying edge computing tasks to a top-k set of prioritized edge devices of a mapped category. In at least one embodiment, DOEAD program 107 may require a user to opt-in to system usage upon opening or installation of DOEAD program 107. Notwithstanding depiction in computer 101, DOEAD program 107 may be stored in and/or executed by, individually or in any combination, end user device 103, remote server 104, public cloud 105, and private cloud 106 so that functionality may be separated among the devices. The edge application deployment method is explained in further detail below with respect to FIG. 2.

Figure 2:
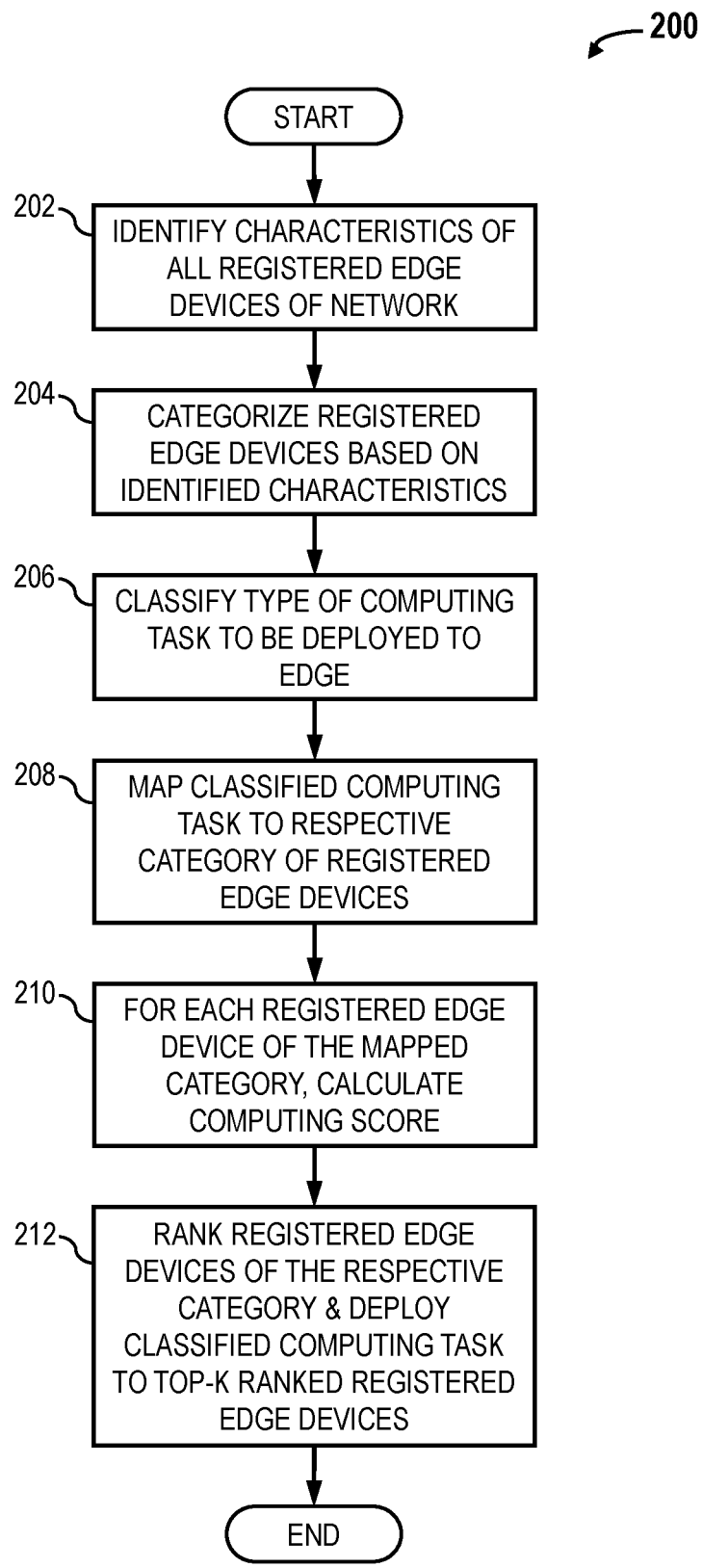
FIG. 2 illustrates an operational flowchart for managing deployment of an application workload to one or more edge devices via an edge application deployment process according to at least one embodiment.

Referring now to FIG. 2, an operational flowchart for managing deployment of an application workload to one or more edge devices via an edge application deployment process 200 is depicted according to at least one embodiment. At 202, DOEAD program 107 identifies computing characteristics of all registered edge devices of a network. As noted above, advances in processing power of edge devices with differing computing capabilities and characteristics combined with growing connectivity of such edge devices has further enabled widespread adoption of edge computing. Consequently, registered edge devices of a network may vary with regard to their respective available computing resources. For example, some registered edge devices may emphasize the use of CPUs for data processing tasks while other registered edge devices may emphasize the use of GPUs or data processing units (DPUs) for data processing tasks. As such, computing characteristics identified by DOEAD program 107 for each registered edge device of the network may include, for example, edge device ID, number of CPUs, number of GPUs, number of DPUs, CPU clock rate, GPU clock rate, DPU clock rate, memory teristics. For example, based on characteristics such as identified number of CPUs and number of GPUs, DOEAD program 107 may categorize each registered edge device of the network as having more CPU power, having more GPU power, or having balanced CPU and GPU power. A category label (e.g., having more CPU power, having more GPU power, or having balanced CPU and GPU power) for a registered edge device may be saved, by DOEAD program 107, as part of the respective DOEAD data structure for each registered edge device. Table 1 below provides an example illustration of how DOEAD program 107 may categorize registered edge devices of a network based on identified number of CPUs and number of GPUs:

TABLE 1

|  | Task Type (CPU/ GPU) | Edge Device ID | CPU Clock Rate (GHZ) | CPU # | GPU Clock Rate (GHZ) | GPU # | Cache Memory Size (GB) | Network Speed (Mbps) | Computing Score |
| --- | --- | --- | --- | --- | --- | --- | --- | --- | --- |
| More GPU Pwr ↑ | 0.9 | D001 | 2 | 2 | 2 | 12 | 64 | 1000 | 33.18 |
|  | 0.9 | D002 | 2 | 4 | 2 | 10 | 64 | 1000 | 12.29 |
|  | 0.9 | D003 | 2 | 6 | 2 | 8 | 64 | 1000 | 7.78 |
|  | 0.9 | D004 | 2 | 8 | 2 | 6 | 64 | 1000 | 5.82 |
|  | 0.9 | D005 | 2 | 10 | 2 | 4 | 64 | 1000 | 4.71 |
|  | 0.9 | D006 | 2 | 12 | 2 | 2 | 64 | 1000 | 4.01 |
| Bal. Pwr | 0.5 | D001 | 2 | 2 | 2 | 12 | 64 | 1000 | 7.36 |
|  | 0.5 | D002 | 2 | 4 | 2 | 10 | 64 | 1000 | 11.57 |
|  | 0.5 | D003 | 2 | 6 | 2 | 8 | 64 | 1000 | 27.00 |
|  | 0.5 | D004 | 2 | 8 | 2 | 6 | 64 | 1000 | 27.00 |
|  | 0.5 | D005 | 2 | 10 | 2 | 4 | 64 | 1000 | 11.57 |
| More CPU Pwr ↓ | 0.5 | D006 | 2 | 12 | 2 | 2 | 64 | 1000 | 7.36 |
|  | 0.2 | D001 | 2 | 2 | 2 | 12 | 64 | 1000 | 4.48 |
|  | 0.2 | D002 | 2 | 4 | 2 | 10 | 64 | 1000 | 5.49 |
|  | 0.2 | D003 | 2 | 6 | 2 | 8 | 64 | 1000 | 7.21 |
|  | 0.2 | D004 | 2 | 8 | 2 | 6 | 64 | 1000 | 10.78 | amounts and types, available network speed/bandwidth, geographic deployment location, time(s) of device processing availability, and applicable security settings/policies. According to at least one embodiment, DOEAD program 107 may dynamically identify computing characteristics of all registered edge devices when a computing task (e.g., an application workload) is to be deployed to the edge. Moreover, identified computing characteristics for respective registered edge devices may be saved as part of a respective DOEAD data structure for each registered edge device. DOEAD data structures may be stored within storage 124 and/or remote database 130 and may be accessible by DOEAD program 107.

According to at least one other embodiment, DOEAD program 107 may identify computing characteristics for respective registered edge devices during an initialization/set-up of DOEAD program 107 and the available edge network. Identified computing characteristics for respective registered edge devices may be saved as part of a respective DOEAD data structure for each registered edge device. DOEAD data structures may be stored within storage 124 and/or remote database 130 and may be accessed (e.g., referenced, updated) by DOEAD program 107 when deploying a computing task to the edge in real-time.

Next, at 204, DOEAD program 107 categorizes the registered edge devices of the network into multiple categories based on their respectively identified computing characteristics. Each category of the multiple categories may include multiple registered edge devices, and categories of the multiple categories may have differing computing charac- At 206, DOEAD program 107 classifies a computing task (e.g., an application workload) which is to be deployed for processing by one or more of the registered edge devices of the network. In classifying the computing task, DOEAD program 107 may identify a task ID and may specify a task type for the computing task. A user may be utilizing multiple software applications for execution of different computing tasks (e.g., augmented reality (AR) rendering, metaverse computing, text-to-speech (TTS) caption generation, handwriting recognition, machine learning, image recognition, etc.) and based on respective computing resource requirements for task execution, these different computing tasks may benefit from deployment to different registered edge devices for processing. As such, a specified task type may be indicative of compute resource need of the computing task. In specifying a task type, DOEAD program 107 may, in an example where CPU and GPU compute resources are compared, specify a value on a range between 0 and 1 where values closer to 0 indicate a need for greater CPU compute resources, values closer to 1 indicate a need for greater GPU compute resources, and values closer to the median indicate a need for balanced CPU and GPU compute resources.

For instance, an artificial intelligence neural network application may process and analyze streaming video which requires both incentive CPU computing and large GPU parallel computing. When specifying a task type for such an application, DOEAD program 107 may specify a value of 0.5 to indicate a need for balanced compute resources on both CPU and GPU. In another instance, a metaverse avatar rendering application may require more GPU resources for real-time three-dimensional (3D) vector computing and may benefit from execution on an edge device with a greater GPU power. When specifying a task type for such an application, DOEAD program 107 may specify a value of 0.9 to indicate a need for more powerful GPU compute resources. It should be noted that the evaluation of CPU and GPU compute resource need is just one example and is not meant to be limiting; other examples may exist where needs for other computing characteristics (e.g., memory, network speed, geographic location, processing availability times) are evaluated.

Next, at 208, DOEAD program 107 maps/correlates the computing task classified at 206 with a respective category, from the multiple categories created at 204, of registered edge devices. The mapping may be based on the specified compute resource need of the computing task and the identified computing characteristics of the registered edge devices of the network. For example, where a task type of the computing task is specified at 0.5, DOEAD program 107 may correlate task ID of the computing task with the categorized group of registered edge devices having balanced CPU and GPU power. As another example, where a task type of the computing task is specified at 0.2, DOEAD program 107 may correlate task ID of the computing task with the categorized group of registered edge devices having more CPU power. As yet another example, where a task type of the computing task is specified at 0.9, DOEAD program 107 may correlate a task ID of the computing task with the categorized group of registered edge devices having more GPU power. According to at least one embodiment, DOEAD program 107 may save, at least temporarily, the identified task ID and the specified task type of the classified computing task as part of one or more of the respective DOEAD data structures of the registered edge devices within the mapped/correlated category.

At 210, DOEAD program 107 calculates an edge computing score for each registered edge device of the mapped/correlated category. Calculation of an edge computing score for a registered edge device may be based on computation using normalized values of the identified computing characteristics of the registered edge device as well as the specified task type value of the computing task mapped/correlated with the registered edge device. For example, within the category of registered edge devices having more GPU power as shown in Table 2 below, edge device with ID D001 may have a CPU clock rate value of 2 GHZ, a CPU # value of 2, a GPU clock rate value of 2 GHZ, a GPU # value of 12, a cache memory size of 64 GB, and a network speed of 1000 Mbps. Furthermore, edge device D001, along with every registered edge device of the category, may be mapped to task ID T1 having a task type value of 0.9 33.18 as shown in Table 2 above. As also seen in Table 2, a similar edge computing score computation process may be performed for edge devices D002-D006 in order to calculate respective scores. According to at least one embodiment, DOEAD program 107 may apply weights to one or more values when calculating an edge computing score. A calculated edge computing score for a registered edge computing device may be saved, at least temporarily, as part of its respective DOEAD data structure.

Next, at 212, DOEAD program 107 ranks/prioritizes the registered edge devices of the mapped/correlated category according to their respective edge computing scores, where top ranked registered edge devices of the mapped category have the highest respective edge computing scores. For example, within the category of registered edge devices having more GPU power as shown in Table 2 above, DOEAD program 107 may assign a top rank value of 1 to D001 having an edge computing score of 33.18, assign a rank value of 2 to D002 having an edge computing score of 12.29, assign a rank value of 3 to D003 having an edge computing score of 7.78, assign a rank value of 4 to D004 having an edge computing score of 5.82, assign a rank value of 5 to D005 having an edge computing score of 4.71, and assign a bottom rank value of 6 to D006 having an edge computing score of 4.01. Also, at 212, DOEAD program 107 deploys the computing task mapped/correlated with the respective category to the top-k ranked registered edge devices of the category. For example, based on the displayed rankings of Table 2 above, DOEAD program 107 may deploy task ID T1 to registered edge device D001 since it has a highest rank within the category of registered edge devices having more GPU power. In deploying the mapped/correlated computing task to the top-k ranked registered edge devices of the respective category, DOEAD program 107 may assign a temporary edge device application ID to the computing task as a means of tracking deployment of the computing task on the top-k ranked registered edge devices of the respective category. The temporary edge device application ID may be associated with a registered edge device while it is used for deployment of a computing task. For example, task ID T1 may be assigned a temporary edge device application ID of AR-Avatar-Render while deployed on registered edge device D001. A rank/priority value as well as an associated edge device application ID of a registered edge computing device may be saved, at least temporarily, as part of its respective DOEAD data structure.

It may be appreciated that FIG. 2 provides only an illustration of one implementation and does not imply any limitations with regard to how different embodiments may

TABLE 2

| Task ID | Task Type (CPU/GPU) | Edge Device ID | CPU Clock Rate (GHZ) | CPU # | GPU Clock Rate (GHZ) | GPU # | Cache Memory Size (GB) | Network Speed (Mbps) | Edge Computing Score | Rank |
|---|---|---|---|---|---|---|---|---|---|---|
| T1 | 0.9 | D001 | 2 | 2 | 2 | 12 | 64 | 1000 | 33.18 | 1 |
| T1 | 0.9 | D002 | 2 | 4 | 2 | 10 | 64 | 1000 | 12.29 | 2 |
| T1 | 0.9 | D003 | 2 | 6 | 2 | 8 | 64 | 1000 | 7.78 | 3 |
| T1 | 0.9 | D004 | 2 | 8 | 2 | 6 | 64 | 1000 | 5.82 | 4 |
| T1 | 0.9 | D005 | 2 | 10 | 2 | 4 | 64 | 1000 | 4.71 | 5 |
| T1 | 0.9 | D006 | 2 | 12 | 2 | 2 | 64 | 1000 | 4.01 | 6 |

DOEAD program 107 may normalize each value (i.e., 2 GHZ, 2, 2 GHZ, 12, 64 GB, 1000 Mbps, 0.9) to a common scale and use them to compute the edge computing score of be implemented. Many modifications to the depicted environments may be made based on design and implementation requirements.

According to at least one further embodiment, DOEAD program 107 may maintain and update DOEAD service profiles which may be associated with edge applications/services executing on one or more of the registered edge devices of the network. For example, a DOEAD service profile associated with an edge application may define deployment criteria of the edge application. Deployment criteria may include, but is not limited to, specified deployment algorithms, specified security protocols to be followed during application deployment, preferred geographic locations of deployed-to registered edge devices, minimum computing resource requirements of deployed-to registered edge devices, specified weight(s) to be applied to normalized values when calculating edge computing scores, and respective DOEAD data structures of deployed-to registered edge devices. A DOEAD service profile may be configured by a user via a graphic user interface (GUI) of DOEAD program 107 during set-up of DOEAD program 107 or during real-time implementation of DOEAD program 107. Moreover, DOEAD program 107 may access DOEAD service profiles, which may be stored within storage 124 or remote database 130, when managing application deployment via the edge application deployment process 200.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    identifying respective computing characteristics of all edge devices of a network;
    categorizing the edge devices into one or more categories based on identified respective computing characteristics;
    classifying a type of a computing task to be deployed to one or more of the edge devices, wherein the computing task is associated with an edge application, and wherein the edge application is associated with a service profile which defines deployment criteria of the computing task, and wherein the deployment criteria comprises specified deployment algorithms, specified security protocols to be followed during application deployment, preferred geographic locations of deployed-to registered edge devices, and minimum computing resource requirements of deployed-to registered edge devices;
    mapping the computing task to a category of the one or more categories based on its classified type;
    calculating a respective computing score for each edge device of the category;
    ranking edge devices of the category based on their respective computing scores;
    deploying, according to the deployment criteria, the computing task to a top-ranked edge device of the category and assigning a temporary edge device application ID to the computing task, wherein the temporary edge device application ID is assigned to the computing task and associated with the top-ranked edge device while it is used for deployment of the computing task; and
    tracking deployment of the computing task via its assigned temporary edge device application ID.

2. The method of claim 1, wherein the one or more categories comprise a category of edge devices having more central processing unit (CPU) power, a category of edge devices having more graphics processing unit (GPU) power, and a category of edge devices having balanced CPU and GPU power.

3. The method of claim 1, wherein respective computing characteristics of an edge device comprise information of available computing resources, geographic deployment location, time(s) of edge device processing availability, and applicable security policies, and wherein the edge devices are registered with the network.

4. The method of claim 1, wherein the type of the computing task comprises a value indicative of a computing resource need of the computing task.

5. The method of claim 4, wherein the mapping is based on computing characteristics of the category and the computing resource need of the computing task.

6. The method of claim 4, wherein calculation of a computing score is based on computation using normalized values of identified respective computing characteristics of an edge device as well as the value indicative of the computing resource need of the computing task.

7. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying respective computing characteristics of all edge devices of a network;
    categorizing the edge devices into one or more categories based on identified respective computing characteristics;
    classifying a type of a computing task to be deployed to one or more of the edge devices, wherein the computing task is associated with an edge application, and wherein the edge application is associated with a service profile which defines deployment criteria of the computing task, and wherein the deployment criteria comprises specified deployment algorithms, specified security protocols to be followed during application deployment, preferred geographic locations of deployed-to registered edge devices, and minimum computing resource requirements of deployed-to registered edge devices;
    mapping the computing task to a category of the one or more categories based on its classified type;
    calculating a respective computing score for each edge device of the category;
    ranking edge devices of the category based on their respective computing scores;
    deploying, according to the deployment criteria, the computing task to a top-ranked edge device of the category and assigning a temporary edge device application ID to the computing task, wherein the temporary edge device application ID is assigned to the computing task and associated with the top-ranked edge device while it is used for deployment of the computing task; and tracking deployment of the computing task via its assigned temporary edge device application ID.

8. The computer system of claim 7, wherein the one or more categories comprise a category of edge devices having more central processing unit (CPU) power, a category of edge devices having more graphics processing unit (GPU) power, and a category of edge devices having balanced CPU and GPU power.

9. The computer system of claim 7, wherein respective computing characteristics of an edge device comprise information of available computing resources, geographic deployment location, time(s) of edge device processing availability, and applicable security policies, and wherein the edge devices are registered with the network.

10. The computer system of claim 7, wherein the type of the computing task comprises a value indicative of a computing resource need of the computing task.

11. The computer system of claim 10, wherein the mapping is based on computing characteristics of the category and the computing resource need of the computing task.

12. The computer system of claim 10, wherein calculation of a computing score is based on computation using normalized values of identified respective computing characteristics of an edge device as well as the value indicative of the computing resource need of the computing task.

13. A computer program product, the computer program product comprising:
one or more computer-readable tangible storage medium and program instructions stored on at least one of the one or more tangible storage medium, the program instructions executable by a processor capable of performing a method, the method comprising:
identifying respective computing characteristics of all edge devices of a network;
categorizing the edge devices into one or more categories based on identified respective computing characteristics;
classifying a type of a computing task to be deployed to one or more of the edge devices, wherein the computing task is associated with an edge application, and wherein the edge application is associated with a service profile which defines deployment criteria of the computing task, and wherein the deployment criteria comprises specified deployment algorithms, specified security protocols to be followed during application deployment, preferred geographic locations of deployed-to registered edge devices, and minimum computing resource requirements of deployed-to registered edge devices;
mapping the computing task to a category of the one or more categories based on its classified type;
calculating a respective computing score for each edge device of the category;
ranking edge devices of the category based on their respective computing scores;
deploying, according to the deployment criteria, the computing task to a top-ranked edge device of the category and assigning a temporary edge device application ID to the computing task, wherein the temporary edge device application ID is assigned to the computing task and associated with the top-ranked edge device while it is used for deployment of the computing task; and
tracking deployment of the computing task via its assigned temporary edge device application ID.

14. The computer program product of claim 13, wherein the one or more categories comprise a category of edge devices having more central processing unit (CPU) power, a category of edge devices having more graphics processing unit (GPU) power, and a category of edge devices having balanced CPU and GPU power.

15. The computer program product of claim 13, wherein respective computing characteristics of an edge device comprise information of available computing resources, geographic deployment location, time(s) of edge device processing availability, and applicable security policies, and wherein the edge devices are registered with the network.

16. The computer program product of claim 13, wherein the type of the computing task comprises a value indicative of a computing resource need of the computing task.

17. The computer program product of claim 16, wherein the mapping is based on computing characteristics of the category and the computing resource need of the computing task.

18. The computer program product of claim 16, wherein calculation of a computing score is based on computation using normalized values of identified respective computing characteristics of an edge device as well as the value indicative of the computing resource need of the computing task.

* * * * *